(12) United States Patent
Komiya et al.

(10) Patent No.: US 9,809,454 B2
(45) Date of Patent: Nov. 7, 2017

(54) METHOD FOR REFINING HYDROGEN

(71) Applicant: JAPAN PIONICS CO., LTD., Hiratsuka-shi, Kanagawa (JP)

(72) Inventors: Yoshinao Komiya, Hiratsuka (JP); Satoshi Arakawa, Hiratsuka (JP); Toshio Akiyama, Atsugi (JP); Yasuo Sato, Chigasaki (JP); Noboru Takemasa, Hadano (JP)

(73) Assignee: JAPAN PIONICS CO., LTD., Kanagawa (JP)

( * ) Notice: Subject to any disclaimer, the term of this patent is extended or adjusted under 35 U.S.C. 154(b) by 102 days.

(21) Appl. No.: 14/873,380

(22) Filed: Oct. 2, 2015

(65) Prior Publication Data

US 2016/0115022 A1   Apr. 28, 2016

(30) Foreign Application Priority Data

Oct. 24, 2014 (JP) ................................ 2014-217191
Nov. 18, 2014 (JP) ................................ 2014-233363

(51) Int. Cl.
 B01D 53/22 (2006.01)
 B01D 53/00 (2006.01)
 C01B 3/50 (2006.01)

(52) U.S. Cl.
 CPC .............. C01B 3/505 (2013.01); B01D 53/00 (2013.01); B01D 53/228 (2013.01);
 (Continued)

(58) Field of Classification Search
 CPC ...... B01D 53/00; B01D 53/22; B01D 53/228; B01D 53/229; B01D 2256/16;
 (Continued)

(56) References Cited

U.S. PATENT DOCUMENTS 4,654,063 A * 3/1987 Auvil ................ B01D 53/229
                                                              210/500.21
5,955,044 A * 9/1999 Lucht ................ B01D 53/229
                                                              422/177

(Continued)

FOREIGN PATENT DOCUMENTS

| JP | 62-128903 A | 6/1987 |
| JP | 1-145302 A | 6/1989 |
| JP | 1-145303 A | 6/1989 |

*Primary Examiner* — Jason M Greene
(74) *Attorney, Agent, or Firm* — Fitch, Even, Tabin & Flannery, LLP

(57) ABSTRACT

The present invention is to provide a method for refining hydrogen with a hydrogen refining device in which the inside of a cell is divided into a primary side space and a secondary side space by palladium alloy capillaries each having one end being closed and a tube sheet supporting the open end of the palladium alloy capillaries, in which impurity-containing hydrogen is introduced from the primary side space to allow hydrogen to permeate the palladium alloy capillaries so as to collect pure hydrogen from the secondary side space. The method for refining hydrogen has a capability of decreasing the removed amount of gas containing impurities and efficiently collecting pure hydrogen from the secondary side space. From hydrogen with 1000 ppm or less of impurities as raw material hydrogen, gas containing impurities that does not penetrate the palladium alloy capillaries is removed from the primary side space at the flow rate of 10% or less of the introduction flow rate of the raw material hydrogen. Furthermore, gas containing impurities that does not penetrate the palladium alloy capillaries is removed from the primary side space at a flow rate based on the content of impurities contained in raw material hydrogen.

4 Claims, 3 Drawing Sheets

(52) U.S. Cl.
CPC .. *B01D 2256/16* (2013.01); *C01B 2203/0233* (2013.01); *C01B 2203/043* (2013.01); *C01B 2203/0405* (2013.01); *C01B 2203/046* (2013.01); *C01B 2203/1211* (2013.01); *C01B 2203/1223* (2013.01); *C01B 2203/1241* (2013.01); *C01B 2203/1247* (2013.01)

(58) Field of Classification Search
CPC . C01B 3/503; C01B 3/505; C01B 2203/0405; C01B 2203/0465
See application file for complete search history.

(56) References Cited

U.S. PATENT DOCUMENTS

| | | | | |
|---|---|---|---|---|
| 6,348,278 | B1* | 2/2002 | LaPierre | B01B 1/005 422/198 |
| 6,592,749 | B1* | 7/2003 | Lokhandwala | B01D 53/229 208/100 |
| 6,977,007 | B2* | 12/2005 | Siadous | B01D 53/229 95/117 |
| 8,002,875 | B1* | 8/2011 | Bossard | B01D 53/22 95/55 |
| 2010/0050812 | A1* | 3/2010 | Van Heeringen | B01D 53/229 75/392 |
| 2010/0126180 | A1* | 5/2010 | Forsyth | B01D 53/229 60/780 |
| 2010/0229721 | A1* | 9/2010 | Khy | B01D 53/22 95/55 |
| 2015/0346140 | A1* | 12/2015 | Kirk | C01B 3/503 205/775 |

\* cited by examiner (1)          (2)

METHOD FOR REFINING HYDROGEN

FIELD OF THE INVENTION

The present invention relates to a method for refining hydrogen using the hydrogen gas permselectivity of palladium alloy membrane. Specifically, the present invention relates to a method for refining hydrogen with a capability of efficiently obtaining pure hydrogen from raw material hydrogen containing impurities that is introduced into the primary side space of a cell.

BACKGROUND OF THE INVENTION

Conventionally, a large amount of high-purity hydrogen gas is used as atmosphere gas at the semiconductor manufacturing process. Such hydrogen gas is required to contain an extremely low concentration of impurities (below ppb level) because the integration degree of semiconductor device increases.

Meanwhile, a method of industrially manufacturing a large amount of high-purity hydrogen gas is known, in which reformed gas obtained from methanol, dimethyl ether, natural gas, liquefied petroleum gas, etc., by steam-reforming reaction is separated into hydrogen and the other gas by cryogenic adsorption, pressure swing adsorption, etc., to obtain hydrogen.

The cryogenic adsorption is to obtain hydrogen by circulating gas containing hydrogen to an adsorption column filled with cryogenic adsorbent by using liquid nitrogen as refrigerant to remove impurities other than hydrogen. The pressure swing adsorption is to obtain hydrogen by repeating the processes such as pressurizing, adsorbing and desorbing impurities, and recovering adsorbent while circulating gas containing hydrogen to a plurality of adsorption columns sequentially. The reformed gas contains carbon monoxide, carbon dioxide, methane, nitrogen, water, etc., besides hydrogen. In cryogenic adsorption and pressure swing adsorption, impurities hardly removed until the concentration of the impurities is extremely low (below ppb level).

In contrast to these methods, a method of producing a relatively small amount of ultrahigh-purity hydrogen gas is known, in which raw material hydrogen containing impurities is supplied to hydrogen separation membrane formed from palladium alloy membrane to collect only hydrogen by using the hydrogen gas permselectivity. A device for such hydrogen refining is provided with an inlet for raw material hydrogen containing impurities, an outlet for pure hydrogen, a gas passage between the inlet and the outlet, and a palladium alloy membrane in the gas passage. Such a device has a structure, for example, in which a plurality of palladium alloy capillaries (hydrogen separation membrane) each having one end being closed and the other end being opened are supported at the open end by a tube sheet and stored in a cell, and the palladium alloy capillaries and the tube sheet divide the cell into two spaces which are a primary side space (an inlet side space for raw material hydrogen containing impurities) and a secondary side space (an outlet side space for pure hydrogen), as shown in JP 62-128903A, JP 01-145302A, and JP 01-145303A.

SUMMARY OF THE INVENTION

The method for refining hydrogen by using hydrogen separation membrane made of palladium alloy has the advantage of being able to obtain high-purity hydrogen gas, compared with cryogenic adsorption and pressure swing adsorption, as described above and also to downsize and simplify the device but has the disadvantage of collecting a small amount of pure hydrogen per unit time. Moreover, since only hydrogen penetrates the palladium alloy capillaries from the primary side space to the secondary side space, impurities accumulate as they are in the primary side space of the cell to decrease the partial pressure of hydrogen, resulting in a smaller amount of pure hydrogen to be collected. Accordingly, gas (hydrogen) containing impurities that does not penetrate the hydrogen separation membrane (palladium alloy capillaries) is removed from the primary side space to discharge the removed gas to the atmosphere or to recover and recycle the removed gas but preferably discharged little. Therefore, the objective of the present invention is to provide a method for refining hydrogen with a capability of decreasing the removed amount of gas containing impurities and efficiently collecting pure hydrogen from the secondary side space.

As the result of their extensive study to solve the problems, the inventors have found that in the above-mentioned method for refining hydrogen, gas containing impurities that does not penetrate the palladium alloy capillaries is removed from the primary side space under a constant condition while the flow rate is controlled with a low regulator, etc., so as to decrease the removed amount of gas containing impurities. The inventors have then accomplished the present invention. Under a constant condition that the inventors have found, the removed amount of gas containing impurities is likely to be constant if the concentration of the impurities contained in raw material hydrogen is low (1000 ppm or less), and the other hand, the removed amount of gas containing impurities is likely to need to be set in proportion to the content of the impurities contained in raw material hydrogen if the concentration of the impurities contained in raw material hydrogen is high (more than 1000 ppm).

According to the present invention, a method for refining hydrogen includes: introducing raw material hydrogen containing 1000 ppm or less of impurities to the primary side space of a cell divided into a primary side space and a secondary side space by a plurality of palladium alloy capillaries each having one end being closed and a tube sheet supporting the palladium alloy capillaries at the open end of the palladium alloy capillaries; allowing hydrogen to permeate the palladium alloy capillaries so as to collect pure hydrogen from the secondary side space; and removing gas containing impurities that does not penetrate the palladium alloy capillaries from the primary side space at the flow rate of 0.00002 times or more of the value ab calculated by multiplying the introduction flow rate a of the raw material hydrogen by the content b (ppm) of the impurities contained in the raw material hydrogen and at the flow rate of 10% or less of the introduction flow rate of the raw material hydrogen.

According to the present invention, a method for refining hydrogen includes: introducing raw material hydrogen containing 1000 ppm or less of impurities to the primary side space of a cell divided into a primary side space and a secondary side space by a plurality of palladium alloy capillaries each having one end being closed and a tube sheet supporting the palladium alloy capillaries at the open end of the palladium alloy capillaries; allowing hydrogen to permeate the palladium alloy capillaries so as to collect pure hydrogen from the secondary side space; and removing gas containing impurities that does not penetrate the palladium alloy capillaries from the primary side space at the flow rate of from 2 to 10% of the introduction flow rate of the raw material hydrogen.

According to the present invention, a method for refining hydrogen includes: introducing raw material hydrogen containing impurities to the primary side space of a cell divided into a primary side space and a secondary side space by a plurality of palladium alloy capillaries each having one end being closed and a tube sheet supporting the palladium alloy capillaries at the open end of the palladium alloy capillaries; allowing hydrogen to permeate the palladium alloy capillaries so as to collect pure hydrogen from the secondary side space; and removing gas containing impurities that does not penetrate the palladium alloy capillaries from the primary side space at the flow rate of 0.00002 times or more of the value ab calculated by multiplying the introduction flow rate a of the raw material hydrogen by the content b (ppm) of the impurities contained in the raw material hydrogen.

According to the present invention, a method for refining hydrogen includes: introducing raw material hydrogen containing 1000 ppm or less of impurities to the primary side space of a cell divided into a primary side space and a secondary side space by a plurality of palladium alloy capillaries each having one end being closed and a tube sheet supporting the palladium alloy capillaries at the open end of the palladium alloy capillaries; allowing hydrogen to permeate the palladium alloy capillaries so as to collect pure hydrogen from the secondary side space; and removing gas containing impurities that does not penetrate the palladium alloy capillaries from the primary side space at the flow rate of 0.00002 times or more of the value ab calculated by multiplying the introduction flow rate a of the raw material hydrogen by the content b (ppm) of the impurities contained in the raw material hydrogen and at the flow rate of 2% or less of the introduction flow rate of the raw material hydrogen.

According to the method for refining hydrogen of the present invention, in a hydrogen refining device provided with a cell with the inside divided into a primary side space and a secondary side space by a plurality of palladium alloy capillaries, etc., gas containing impurities that does not penetrate the palladium alloy capillaries is discharged from the primary side space under a constant condition or according to the content of the impurities contained in raw material hydrogen while controlling the flow rate with a flow regulator, etc. Therefore, the present invention can decrease the discharge rate of the gas (hydrogen) containing impurities to 10% or less of the introduction flow rate of the raw material hydrogen, or the minimum or an amount close thereto. As a result, the loss of the raw material hydrogen is suppressed to efficiently collect pure hydrogen from the secondary side space.

DETAILED DESCRIPTION OF THE INVENTION

The present invention is applied to a method for refining hydrogen with a hydrogen refining device in which the inside of a cell is divided into a primary side space and a secondary side space by palladium alloy capillaries each having one end being closed and a tube sheet supporting the open end of the palladium alloy capillaries, in which impurity-containing hydrogen is introduced from the primary side space to allow hydrogen to permeate the palladium alloy capillaries so as to collect pure hydrogen from the secondary side space. Examples of the raw material hydrogen applied in the present invention includes reformed gas obtained from methanol, dimethyl ether, natural gas, liquefied petroleum gas, etc., by steam-reforming reaction and relatively high-purity hydrogen gas obtained by previously refining this reformed gas by cryogenic adsorption, pressure swing adsorption, etc. Hydrogen obtained by these methods is typically stored in a storage system such as a gas cylinder or a storage tank. The ultrahigh-purity hydrogen obtained in the present invention is used as, for example, atmosphere gas (carrier gas) in the semiconductor manufacturing process.

Figure 1:
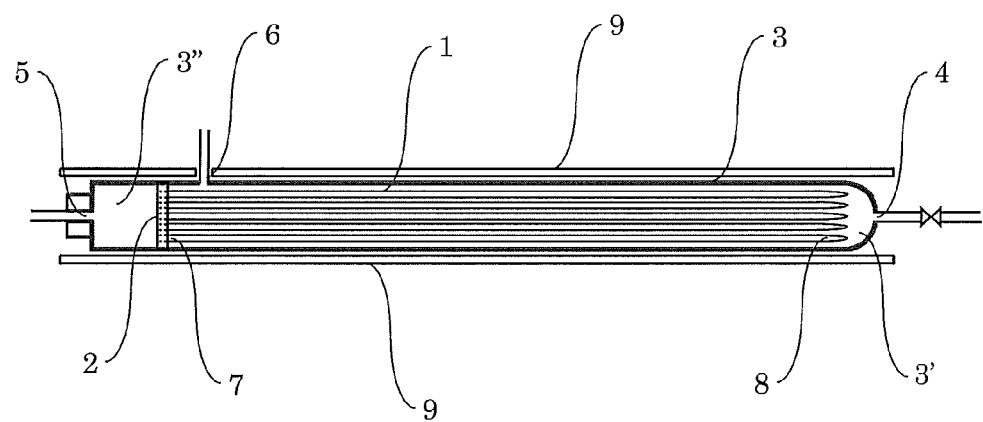
FIG. 1 shows a block diagram illustrating one example of the part around the cell of the hydrogen refining device used for the method for refining hydrogen of the present invention.
Figure 2:
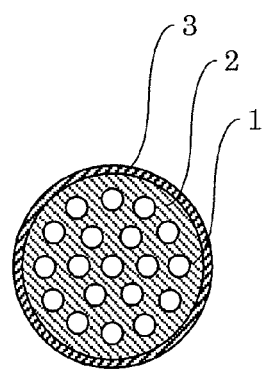
FIG. 2 shows a block diagram illustrating one example of the cross section of the palladium alloy membrane unit at the tube sheet of FIG. 1.
Figure 3:
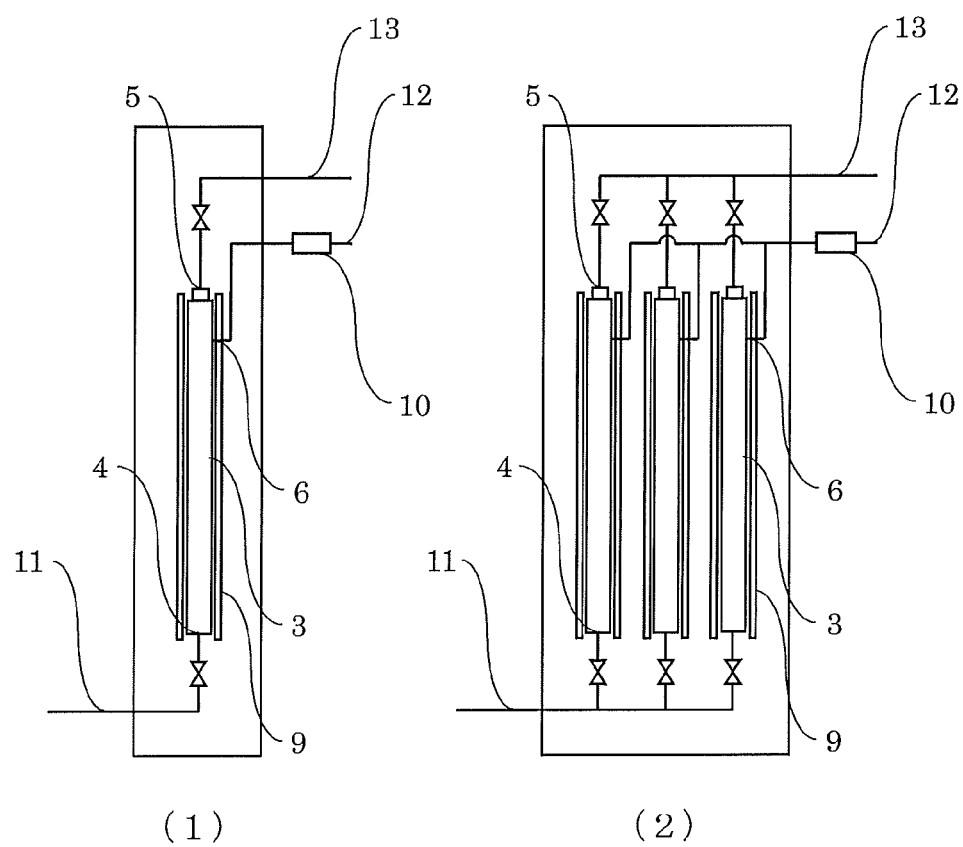
FIGS. 3(1) and 3(2) show a block diagram illustrating one example of the hydrogen refining device used for the method for refining hydrogen of the present invention.

Embodiments of the method for refining hydrogen are described below in detail with reference to FIGS. 1 to 4. However, the present invention is not limited to these embodiments. FIG. 1 shows a block diagram illustrating one example of the part around the cell of the hydrogen refining device used for the method for refining hydrogen of the present invention. FIG. 2 shows a block diagram illustrating one example of the cross section of the cell of the hydrogen refining device shown in FIG. 1 at the position of the tube sheet. FIGS. 3(1) and 3(2) show a block diagram illustrating one example of the hydrogen refining device used for the method for refining hydrogen of the present invention.

Figure 4:
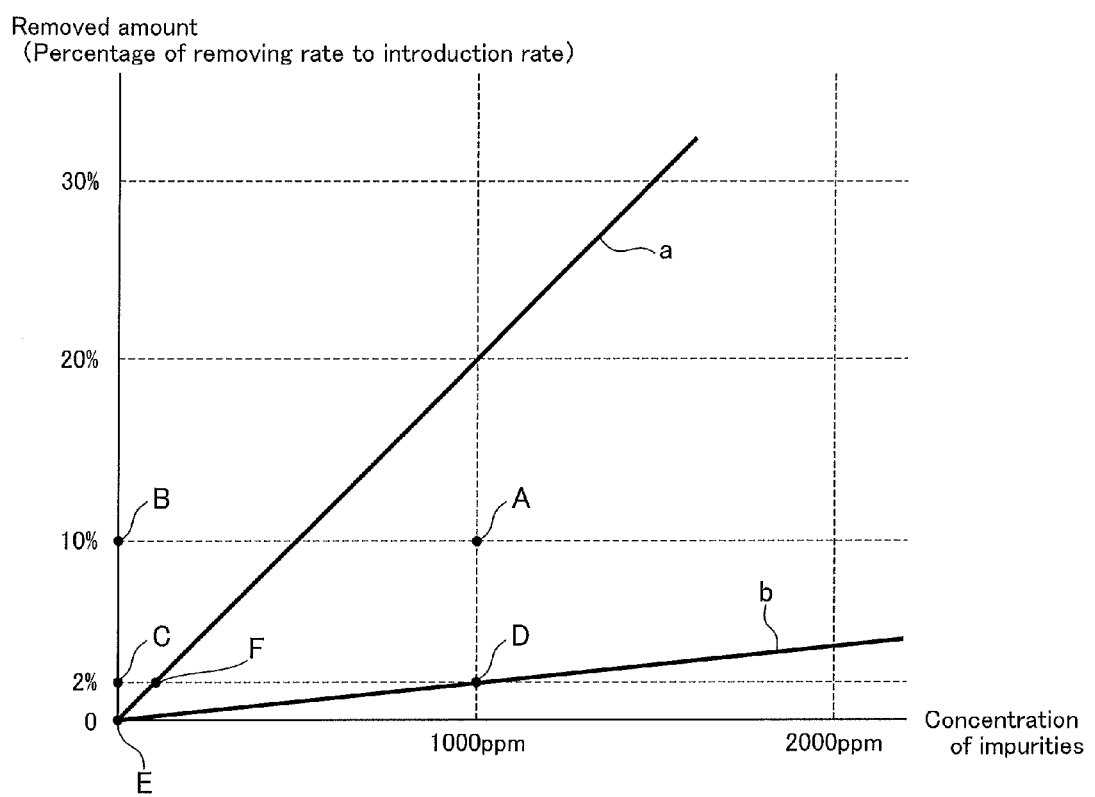
FIG. 4 shows a graph illustrating the amount of gas containing impurities that is removed from the primary side space and the concentration of the impurities in the method for refining hydrogen of the present invention.

FIG. 4 shows a graph illustrating the amount of gas containing impurities that is removed from the primary side space and the concentration of the impurities in the method for refining hydrogen of the present invention.

The first embodiment of the method for refining hydrogen of the present invention includes: introducing raw material hydrogen containing 1000 ppm or less of impurities (in the left side from the line drawn through the points A and D shown in FIG. 4) to the primary side space of a cell divided into a primary side space and a secondary side space by a plurality of palladium alloy capillaries each having one end being closed and a tube sheet supporting the palladium alloy capillaries at the open end of the palladium alloy capillaries; allowing hydrogen to permeate the palladium alloy capillaries so as to collect pure hydrogen from the secondary side space; and removing gas containing impurities that does not penetrate the palladium alloy capillaries from the primary side space at the flow rate of 0.00002 times or more of the value ab (in the upper side from the line b shown in FIG. 4) calculated by multiplying the introduction flow rate a of the raw material hydrogen by the content b (ppm) of the impurities contained in the raw material hydrogen and at the flow rate of 10% or less of the introduction flow rate (in the left side from the line drawn through the points A and D shown in FIG. 4) of the raw material hydrogen. The amount of gas containing impurities that is removed from the primary side space and the concentration of the impurities herein have the relationship in the range drawn through the points A, B, C, E, D, and A again shown in FIG. 4.

The second embodiment of the method for refining hydrogen of the present invention includes: introducing raw material hydrogen containing 1000 ppm or less of impurities (in the left side from the line drawn through the points A and D shown in FIG. 4) to the primary side space of a cell divided into a primary side space and a secondary side space by a plurality of palladium alloy capillaries each having one end being closed and a tube sheet supporting the palladium alloy capillaries at the open end of the palladium alloy capillaries; allowing hydrogen to permeate the palladium alloy capillaries so as to collect pure hydrogen from the secondary side space; and removing gas containing impurities that does not penetrate the palladium alloy capillaries from the primary side space at the flow rate of from 2 to 10% of the introduction flow rate (in the upper side from the line drawn through the points C and D and the lower side from the line drawn the points B and A, shown in FIG. 4) of the raw material hydrogen. The amount of gas containing impurities that is removed from the primary side space and the concentration of the impurities herein have the relationship in the range drawn through the points A, B, C, D, and A again shown in FIG. 4.

The third embodiment of the method for refining hydrogen of the present invention includes: introducing raw material hydrogen containing impurities to the primary side space of a cell divided into a primary side space and a secondary side space by a plurality of palladium alloy capillaries each having one end being closed and a tube sheet supporting the palladium alloy capillaries at the open end of the palladium alloy capillaries; allowing hydrogen to permeate the palladium alloy capillaries so as to collect pure hydrogen from the secondary side space; and removing gas containing impurities that does not penetrate the palladium alloy capillaries from the primary side space at the flow rate of 0.00002 times or more of the value ab (between the lines a and b shown in FIG. 4) calculated by multiplying the introduction flow rate a of the raw material hydrogen by the content b (ppm) of the impurities contained in the raw material hydrogen. The amount of gas containing impurities that is removed from the primary side space and the concentration of the impurities herein have the relationship in the range from the lower side of the line drawn through the points E and F to the upper side of the line drawn through the points E and D, shown in FIG. 4.

The fourth embodiment of the method for refining hydrogen of the present invention, a method for refining hydrogen includes: introducing raw material hydrogen containing 1000 ppm or less of impurities to the primary side space of a cell divided into a primary side space and a secondary side space by a plurality of palladium alloy capillaries each having one end being closed and a tube sheet supporting the palladium alloy capillaries at the open end of the palladium alloy capillaries; allowing hydrogen to permeate the palladium alloy capillaries so as to collect pure hydrogen from the secondary side space; and removing gas containing impurities that does not penetrate the palladium alloy capillaries from the primary side space at the flow rate of 0.00002 times or more of the value ab (in the upper side from the line b shown in FIG. 4) calculated by multiplying the introduction flow rate a of the raw material hydrogen by the content b (ppm) of the impurities contained in the raw material hydrogen and at the flow rate of 2% or less of the introduction flow rate (in the lower side from the line drawn through the points C and D) of the raw material hydrogen. The amount of impurity-containing gas removed from the primary side space and the concentration of the impurities herein have the relationship in the range drawn through the points D, C, E, and D again shown in FIG. 4.

In the practice of the method for refining hydrogen of the present invention, for example, a hydrogen refining device with a structure divided into a primary side space 3' and a secondary side space 3" by a plurality of palladium alloy capillaries 1 each having one end being closed and a tube sheet 2 supporting the palladium alloy capillaries at the open end of the palladium alloy capillaries is used, which is further provided with a raw material hydrogen inlet 4 introducing raw material hydrogen containing impurities to the primary side space 3', a pure hydrogen outlet 5 collecting pure hydrogen that has penetrated the palladium alloy capillaries 1 from the secondary side space 3", an impurity-containing gas outlet 6 removing gas containing impurities that does not penetrate the palladium alloy capillaries 1 from the primary side space 3', and a flow regulator 10 located in the downstream side of the impurity-containing gas outlet 6 to control the flow rate of gas containing impurities, as shown in FIGS. 1 to 3.

In the method for refining hydrogen according to the first, the second, and the fourth embodiments of the present invention, hydrogen with a purity of 99.9% or more (hydrogen containing with 1000 ppm or less of impurities) is used as raw material hydrogen. Such raw material hydrogen is obtained, for example, by removing impurities from reformed gas obtained from methanol, dimethyl ether, natural gas, and liquefied petroleum gas by steam-reforming reaction by cryogenic adsorption or pressure swing adsorption until the concentration of the impurities is reduced to 1000 ppm or less. If raw material hydrogen containing more than 1000 ppm of impurities is used, the concentration of the impurities is preferably previously adjusted to 1000 ppm or less by pretreatment such as cryogenic adsorption and pressure swing absorption because the removed amount of gas containing impurities increases.

In the method for refining hydrogen according to the first, the second, and the fourth embodiments of the present invention, if the impurity-containing gas outlet 6 is not provided or if the amount of gas containing impurities that is removed from the impurity-containing gas outlet 6 is less than a predetermined amount, impurities (gas) accumulate in the primary side space 3' of the cell 3 to decrease the concentration of hydrogen. This may decrease the amount of pure hydrogen to be collected per unit time as time proceeds or may increase the pressure of the primary side space 3' too much. On the other hand, if the amount of gas containing impurities that is removed from the impurity-containing gas outlet 6 is more than 10% of the introduction flow rate of the raw material hydrogen, the amount of gas containing impurities that is, for example, to be discharged to the atmosphere or to be recovered increases. This causes a loss of raw material hydrogen.

In the method for refining hydrogen according to the third embodiment of the present invention, the purity of raw material hydrogen is not limited in particular. The method according to the third embodiment is applied particularly to raw material hydrogen containing more than 1000 ppm of impurities. In the method for refining hydrogen according to the third embodiment of the present invention, if the impurity-containing gas outlet 6 is not provided or if the amount of gas containing impurities that is removed from the impurity-containing gas outlet 6 is less than a predetermined amount, impurities (gas) accumulate in the primary side space 3' of the cell 3 to decrease the concentration of hydrogen. This may decrease the amount of pure hydrogen to be collected per unit time as time proceeds or may increase the pressure of the primary side space 3' too much. On the other hand, if the amount of gas containing impurities that is removed from the impurity-containing gas outlet 6 is much more than a predetermined amount, the amount of gas containing impurities that is, for example, to be discharged to the atmosphere or to be recovered increase. This causes a loss of raw material hydrogen.

In the method for refining hydrogen according to the third embodiment of the present invention, gas containing impurities that does not penetrate the palladium alloy capillaries is removed from the primary side space at the flow rate of from 0.00002 to 0.0002 times, preferably 0.00002 to 0.0001 times of the value ab calculated by multiplying the introduction flow rate a of the raw material hydrogen by the content b (ppm) of the impurities contained in the raw material hydrogen. As a result, pure hydrogen can be efficiently collected from the secondary side space. For example, when the content of impurities contained in raw material hydrogen is 1000 ppm (the purity of raw material hydrogen: 99.9%), the discharge rate of gas containing impurities that does not penetrate the palladium alloy capillaries is controlled to from 2 to 20%, preferably from 2 to 10% of the introduction flow rate of the raw material hydrogen.

The component parts of the hydrogen refining device used for the method for refining hydrogen of the present invention are described in detail below.

The palladium alloy capillaries 1 used in the method for refining hydrogen of the present invention each have an open end 7 at one end in the tube sheet 2 side and a close end 8 at the other end opposite to the tube sheet 2 side as shown in FIG. 1. The palladium alloy capillaries 1 typically have a length of from 20 to 200 cm, an outer diameter of from 1.0 to 5.0 mm, and a thickness of from 30 to 100 µm. The number of the palladium alloy capillaries 1 used in one cell is from 3 to 1000. The arrangement of the palladium alloy capillaries 1 is not limited in particular. The distance between any two adjacent palladium alloy capillaries is typically set to from 1.0 to 2.5 mm.

Examples of the component of the above-described palladium alloy capillaries 1 include an alloy of mainly palladium and copper, an alloy of mainly palladium and silver, and an alloy of mainly palladium, silver, and gold. When these alloys are used, an alloy of from 50 to 70 wt % of palladium and from 30 to 50 wt % of copper, an alloy of from 60 to 90 wt % of palladium and from 10 to 40 wt % of silver, and an alloy of from 60 to 80 wt % of palladium, from 10 to 37 wt % of silver, and from 3 to 10 wt % of gold are preferable. The palladium alloy may contain other metals. In this case, the palladium alloy contains the above-described metals (palladium, gold, silver or copper) in a content of typically 95 wt % or more, preferably 99 wt % or more.

The tube sheet 2 used in the present invention is typically a disk with a thickness of from 3 to 30 mm. The diameter of the tube sheet 2 varies according to the diameter, the number, etc., of the palladium alloy capillaries 1 but is typically from 10 to 200 mm. The tube sheet 2 is provided with through holes to insert the palladium alloy capillaries 1 at the positions to which the respective palladium alloy capillaries 1 are attached. The palladium alloy capillaries 1 are supported by the tube sheet 2 through welding, etc. In this case, a coiled spring may optionally be inserted in the palladium alloy capillaries 1, as needed, in order to ensure a flow path space for pure hydrogen that has permeated the tube surface of the palladium alloy capillaries. The tube sheet 2 is preferably made of nickel.

In the present invention, the impurity-containing gas outlet 6 is located anywhere without any particular limitation as long as located in the upstream side of the tube sheet 2 but preferably located away from the raw material hydrogen inlet 4. In the present invention, the hydrogen refining device is provided with a flow regulator 10 located in the downstream side of the impurity-containing gas outlet 6 to control the flow rate of gas containing impurities, as shown in FIGS. 3(1) and 3(2). As the flow regulator 10, a restriction flowmeter (Venturi flowmeter), a differential pressure flow meter (orifice flowmeter), etc., can be used. The flow regulator 10 is located anywhere without any particular limitation but typically located from 5 to 200 cm away from the impurity-containing gas outlet 6.

In the present invention, the raw material hydrogen inlet 4, the pure hydrogen outlet 5, and the impurity-containing gas outlet 6 are connected with the respective exterior pipes, and raw material hydrogen is then supplied from the raw material hydrogen inlet pipe 11 while the inside of the cell 3 is heated with a heater 9, to refine hydrogen, as shown in FIGS. 3(1) and 3(2). The temperature of the palladium alloy capillaries 1 during hydrogen refining is typically from 250 to 500° C., preferably from 300 to 450° C. The raw material hydrogen is brought in contact with the heated palladium alloy capillaries 1 to allow only hydrogen to permeate the palladium alloy capillaries 1. This enables only hydrogen to be collected through the pure hydrogen outlet 5 and the pure hydrogen outlet pipe 12.

In the present invention, the pressure difference between the primary side space 3' and the secondary side space 3" is preferably set to from 0.5 to 2 MPa during hydrogen refining. The temperature difference between the gas at a raw material hydrogen inlet and the gas at an impurity-containing gas outlet is preferably set to 50° C. or less. If the pressure difference and temperature difference are not set to within the above-mentioned respective ranges, gas containing impurities that does not penetrate the palladium alloy capillaries is hardly removed from the primary side space 3' at the flow rate of from 2 to 10% of the introduction flow rate of the raw material hydrogen or at the flow rate of 0.00002 times or more of the value calculated by multiplying the introduction flow rate a of the raw material hydrogen by the content b (ppm) of the impurities contained in the raw material hydrogen in the treatment operation.

EXAMPLES

The present invention is explained below with reference to the following examples but is not limited thereto.

Preparation of Hydrogen Refining Device 35 palladium alloy capillaries 1 (outer diameter: 1.8 mm, thickness: 70 µm, length: 300 mm) formed of an alloy of mainly palladium, silver, and gold were welded to a disk-shaped nickel tube sheet 2 with a diameter of 25 mm and a thickness of 5 mm along a plurality of concentric circles. The tube sheet 2 and the palladium alloy capillaries 1 are stored in a cell 3 with an internal diameter of 25 mm and a length of 400 mm which is made of SUS316L and provided with a raw material hydrogen inlet 4, a pure hydrogen outlet 5, and an impurity-containing gas outlet 6 located at the respective positions as shown in FIG. 1.

After a heater 9 is provided outside the cell 3, the raw material hydrogen inlet 4, the pure hydrogen outlet 5, and the impurity-containing gas outlet 6 are connected with a raw material hydrogen inlet pipe 11, a pure hydrogen outlet pipe 13, and an impurity-containing gas outlet pipe 12, respectively. In the impurity-containing gas outlet pipe 12, a restriction flowmeter is provided as a flow regulator 10 to prepare a hydrogen refining device with the configuration shown in FIG. 3(1).

Example 1

Hydrogen Refining Test by the Method for Refining Hydrogen According to the First and the Second Embodiments The inside of the primary side space 3' of the cell of the hydrogen refining device was heated to 600° C., and hydrogen was introduced and heated for 10 hours. Subsequently, the inside of the primary side space 3' of the cell of the hydrogen refining device was decreased to 420° C. Raw material hydrogen containing about 500 ppm of impurities (nitrogen, oxygen, carbon dioxide, etc.) in total was then introduced at a flow rate of 14 L/min from the raw material hydrogen inlet 4 to allow pure hydrogen to penetrate the palladium alloy capillaries. While the pure hydrogen was collected through the pure hydrogen outlet 5, gas containing impurities that does not penetrate the palladium alloy capillaries was removed from the primary side space 3' at a flow rate of 0.7 L/min (5% of the introduction flow rate of the raw material hydrogen). After 1 hour, about 800 L of pure hydrogen was obtained from the pure hydrogen outlet pipe 13.

The flow rate at which pure hydrogen was collected from the pure hydrogen outlet pipe 13 was constant. The pressure difference between the primary side space 3' and the secondary side space 3" was maintained at about 1 MPa. The temperature difference between the gas at the raw material hydrogen inlet and the gas at the impurity-containing gas outlet was maintained at 20° C. or less. Examples 2 to 4 described below were performed by a similar pressure difference and a similar temperature difference.

Example 2

Hydrogen Refining Test by the Method for Refining Hydrogen According to the Third Embodiment The hydrogen refining test was performed with the same hydrogen refining device as that used in Example 1. The hydrogen refining test was performed in the same way as Example 1 except that raw material hydrogen containing about 2000 ppm of impurities in total was used. From raw material hydrogen introduced at 14 L/min, gas containing impurities that does not penetrate the palladium alloy capillaries was removed at a flow rate of 1.4 L/min (0.00005 times the value ab (a: 14, b: 2000)). After 1 hour, about 760 L of pure hydrogen was obtained from the pure hydrogen outlet pipe 13.

Example 3

Hydrogen Refining Test by the Method for Refining Hydrogen According to the Fourth Embodiment The hydrogen refining test was performed with the same hydrogen refining device as that used in Example 1. The hydrogen refining test was performed in the same way as Example 1 except that raw material hydrogen containing about 200 ppm of impurities in total was used. From raw material hydrogen introduced at 14 L/min, gas containing impurities that does not penetrate the palladium alloy capillaries was removed at a flow rate of 0.14 L/min (0.00005 times the value ab (a: 14, b: 200)). After 1 hour, about 830 L of pure hydrogen was obtained from the pure hydrogen outlet pipe 13.

Example 4

Hydrogen Refining Test by the Method for Refining Hydrogen According to the First to the Fourth Embodiments The hydrogen refining test was performed with the same hydrogen refining device as that used in Example 1. The hydrogen refining test was performed in the same way as Example 1 except that the flow rate of gas containing impurities that does not penetrate the palladium alloy capillaries was set to 0.0001 times the value ab (calculated by multiplying the introduction flow rate a of the raw material hydrogen by the content b (ppm) of the impurities contained in the raw material hydrogen). From raw material hydrogen introduced at 14 L/min, gas containing impurities that does not penetrate the palladium alloy capillaries was removed at a flow rate of 0.28 L/min (a: 14, b: 200). After 1 hour, about 820 L of pure hydrogen was obtained from the pure hydrogen outlet pipe 13.

As mentioned above, since reducing the gas containing impurities that does not penetrate the palladium alloy capillaries according to the content of impurities contained in raw material hydrogen, the present invention can suppress the loss of raw material hydrogen to efficiently collect pure hydrogen from the secondary side space.

REFERENCE SIGNS LIST

1 palladium alloy capillary
2 tube sheet
3 cell
3' primary side space of cell
3" secondary side space of cell
4 raw material hydrogen inlet
5 pure hydrogen outlet
6 impurity-containing gas outlet
7 open end
8 close end
9 heater
10 flow regulator
11 raw material hydrogen inlet pipe
12 impurity-containing gas outlet pipe
13 pure hydrogen outlet pipe

The invention claimed is:

1. A method for refining hydrogen, comprising: introducing raw material hydrogen containing impurities to the primary side space of a cell divided into a primary side space and a secondary side space by a plurality of palladium alloy capillaries each having one end being closed and a tube sheet supporting the palladium alloy capillaries at the open end of the palladium alloy capillaries; allowing hydrogen to permeate the palladium alloy capillaries so as to collect pure hydrogen from the secondary side space; and removing gas containing impurities that does not penetrate the palladium alloy capillaries from the primary side space at the flow rate of from 0.00002 to 0.0002 times of the value ab calculated by multiplying the introduction flow rate a of the raw material hydrogen by the content b (ppm) of the impurities contained in the raw material hydrogen.

2. The method according to claim 1, wherein the raw material hydrogen contains 1000 ppm or more of impurities.

3. The method according to claim 1, wherein the pressure difference between the primary side space and the secondary side space is set to from 0.5 to 2 MPa.

4. The method according to claim 1, wherein the temperature difference between the gas at a raw material hydrogen inlet and the gas at an impurity-containing gas outlet is set to 50° C. or less.

* * * * *